(12) United States Patent
Oya et al.

(10) Patent No.: US 7,659,031 B2
(45) Date of Patent: Feb. 9, 2010

(54) SIZE AA ALKALINE BATTERY

(75) Inventors: Kuniyasu Oya, Fukushima (JP); Kenta Yamamoto, Fukushima (JP); Naoko Yamakawa, Fukushima (JP)

(73) Assignee: Sony Corporation, Tokyo (JP)

( * ) Notice: Subject to any disclaimer, the term of this patent is extended or adjusted under 35 U.S.C. 154(b) by 276 days.

(21) Appl. No.: 11/268,964

(22) Filed: Nov. 8, 2005

(65) Prior Publication Data
US 2006/0115731 A1   Jun. 1, 2006

(30) Foreign Application Priority Data
Nov. 30, 2004   (JP) .............................. P2004-345760

(51) Int. Cl.
*H01M 4/42* (2006.01)

(52) U.S. Cl. .................. 429/229; 429/231; 429/223; 429/224; 429/206; 429/232; 429/217; 429/174; 429/211; 429/254

(58) Field of Classification Search ................. 429/129, 429/229, 231, 223, 22, 206, 232, 217, 174, 429/211, 254
See application file for complete search history.

(56) References Cited

U.S. PATENT DOCUMENTS

| 5,346,783 A | * | 9/1994 | Tomantschger et al. | ........ 429/66 |
| 5,378,559 A | * | 1/1995 | Randell et al. | .............. 429/206 |
| 2001/0028976 A1 | * | 10/2001 | Treger et al. | .................. 429/56 |

FOREIGN PATENT DOCUMENTS

JP    2003022792 A * 1/2003

* cited by examiner

*Primary Examiner*—Jane Rhee
(74) *Attorney, Agent, or Firm*—Sonnenschein Nath & Rosenthal LLP

(57) ABSTRACT

A size AA alkaline battery includes an anode principally composed of zinc functioning as an active material, a cathode principally composed of manganese dioxide or nickel oxyhydroxide functioning as an active material, a separator composed of a nonwoven fabric, an electrolyte composed of an aqueous solution of potassium hydroxide, and zinc oxide.

9 Claims, 5 Drawing Sheets

Zn  ZnO  O₂  H₂

$$ZnO + H_2O + 2e^- \rightarrow Zn + 2OH^-$$

$$2H_2O + 2e^- \rightarrow 2OH^- + H_2 \uparrow$$

SIZE AA ALKALINE BATTERY

CROSS REFERENCES TO RELATED APPLICATIONS

The present invention contains subject matter related to Japanese Patent Application JP 2004-345760 filed in the Japanese Patent Office on Nov. 30, 2004, the entire contents of which are incorporated herein by reference.

BACKGROUND OF THE INVENTION

1. Field of the Invention

The present invention relates to a size AA alkaline battery in which discharge characteristics are improved and leakage of an electrolyte is suppressed.

2. Description of the Related Art

In recent years, trends toward miniaturization and portability of electronic devices have increased the number of commercially available alkaline battery-operated products. Potassium hydroxide solutions have been used as electrolytes in such alkaline batteries. Leakage of the electrolytes from the batteries to the exterior may disadvantageously cause damage to the electronic devices or human bodies. In particular, in a device in which four batteries are serially connected, when one battery among the four batteries is installed in reverse polarity, the electrolyte can easily leak from the battery to the exterior. There has been a need for improvement in such a case. For example, when one battery among the four batteries is installed in reverse polarity, Japanese Unexamined Patent Application Publication No. 5-135776 discloses a safety measure. That is, in each of a size D battery and a size C battery, a safety measure to prevent a current from flowing by providing a projection at an anode terminal is taken.

SUMMARY OF THE INVENTION

Such a method of providing a projection at an anode terminal of a size D battery or a size C battery is difficult to be applied to a size AA alkaline battery because of the small size of the anode terminal of the size AA alkaline battery. Therefore, in the present circumstances, there is no safety measure for the size AA alkaline battery when one battery among the four batteries is installed in reverse polarity.

According to an embodiment of the present invention, there is provided a size AA alkaline battery that has improved leakage resistance even when one battery among four batteries connected in series is installed in reverse polarity.

According to an embodiment of the present invention, there is provided a size AA alkaline battery including an anode principally composed of zinc functioning as an active material, a cathode principally composed of manganese dioxide or nickel oxyhydroxide functioning as an active material, a separator composed of a nonwoven fabric, an electrolyte composed of an aqueous solution of potassium hydroxide, and zinc oxide, the content of zinc oxide being 0.08 to 0.1 g.

The air permeability of the separator composed of a nonwoven fabric is preferably 50 to 65 ml/sec/cm$^2$. When an oxygen gas moves to the anode through the separator, excessively high air permeability leads to an unsatisfactory result.

When one battery among four batteries connected in series is installed in reverse polarity, the reversely installed battery is charged with other three batteries through the circuit of a device. An oxygen gas generated in the cathode of the charged battery moves to the anode, thereby oxidizing zinc in the anode. This has a significant effect on leakage of an electrolyte when one battery among four batteries connected in series is installed in reverse polarity.

When a large current flows through the circuit of the device, a hydrogen gas and an oxygen gas are generated in the anode and the cathode, respectively. Thus, the pressure in the battery is increased and then activates the safety valve of a plastic seal. As a result, the gases leak from the battery to the exterior. At the same time, the electrolyte also leaks.

When a small current flows through the circuit of the device, the following reaction occurs; hence, leakage is difficult to occur. An oxygen gas generated by charge reaction in the cathode moves to the anode through the separator and is consumed by oxidation of zinc in the anode into zinc oxide. Therefore, the pressure in the battery is not increased. The resulting zinc oxide is reduced into zinc by charge. This reaction occurs before a hydrogen-generating reaction. Thus, a hydrogen gas is not generated, and the pressure in the battery is not increased. Strictly speaking, when a large current flows through the circuit of the device, an oxygen gas generated in the cathode moves to the anode through the separator and oxidizes zinc in the anode to form zinc oxide. When the hydrogen-generation rate is higher than the oxidation rate, the pressure in the battery is increased, thereby causing leakage.

According to an embodiment of the present invention, there is provided a battery containing a large amount of zinc oxide. At the initial stage of the reaction in the battery installed in reverse polarity, a reduction reaction of zinc oxide occurs before a hydrogen-generating reaction. During the reduction reaction, an adequate amount of oxygen is generated in the cathode. Then, oxygen moves to the anode through the separator and oxidizes zinc in the anode to form zinc oxide. Therefore, even when zinc oxide that is contained from the start is consumed, the generation of a hydrogen gas is continuously suppressed.

Furthermore, when a separator having higher air permeability and preferably when a separator having an air permeability of 50 to 65 ml/sec/cm$^2$ is used, the oxygen transfer rate through the separator is high. Thus, zinc can be readily changed into zinc oxide. Therefore, the occurrence of leakage of the electrolyte is suppressed even in a device in which a larger current flows.

According to an embodiment of the present invention, there is provided a battery having satisfactory discharge characteristics and having the effect of preventing leakage of an electrolyte when one battery among four batteries is installed in reverse polarity, by specifying the mass of zinc oxide contained in a size AA alkaline battery. Furthermore, in a battery installed in reverse polarity, by specifying the air permeability of the separator, even when a larger current flows, the occurrence of leakage of the electrolyte can be prevented.

DESCRIPTION OF THE PREFERRED EMBODIMENTS

Figure 1:
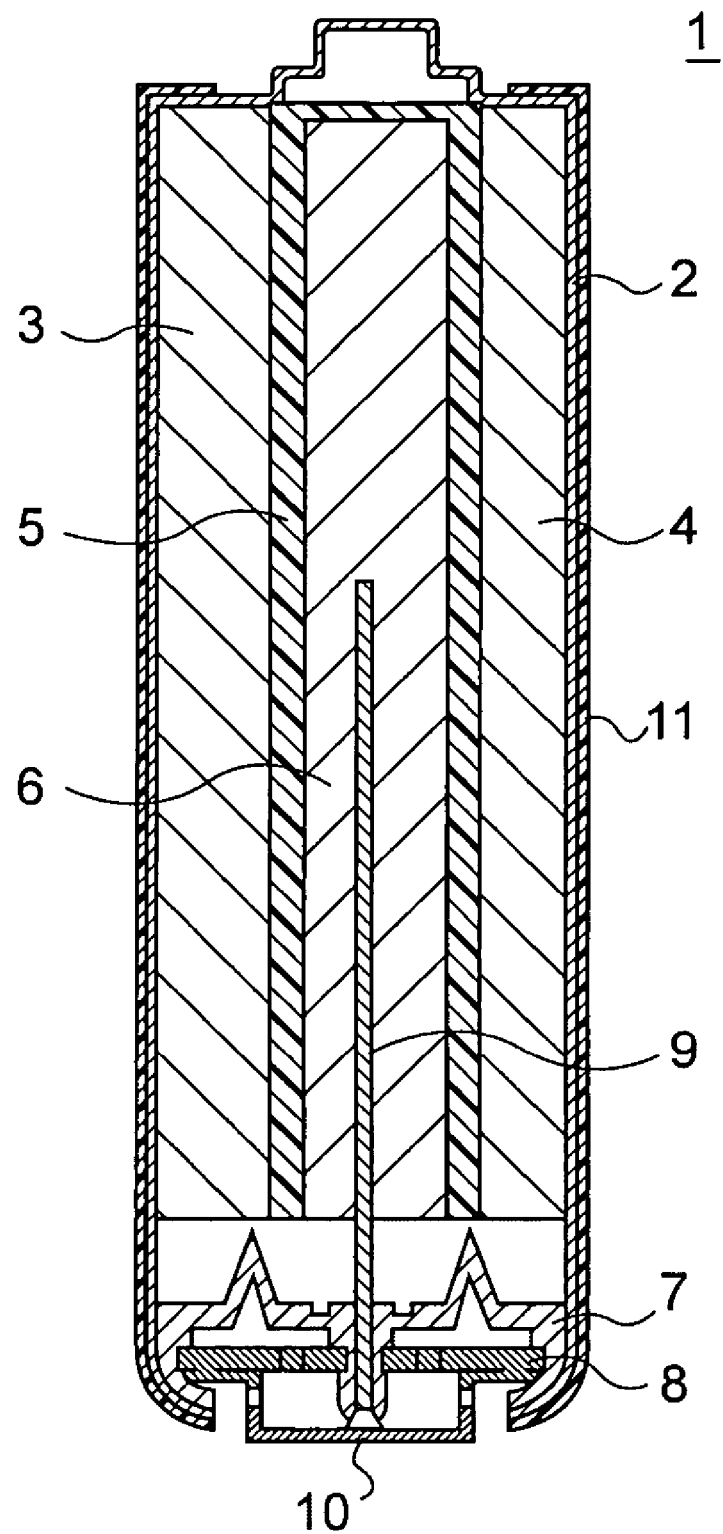
FIG. 1 shows an exemplary structure illustrating a size AA alkaline battery according to an embodiment of the present invention.

FIG. 1 shows an exemplary structure of a size AA alkaline battery according to an embodiment of the present invention. The size AA alkaline battery includes a hollow cylindrical cathode 4, a cylindrical separator 5 having a bottom, the separator 5 being in contact with the cathode 4, an anode 6 disposed in the separator 5, an electrolyte, and a hollow-cylindrical metal cathode can 2 having an opening and a bottom, the cathode 4, the separator 5, the anode 6, and the electrolyte being housed in the cathode can 2. The size AA alkaline battery shown in FIG. 1 further includes a sealing unit for sealing the opening of the cathode can 2.

Furthermore, the periphery of the cylinder of the size AA alkaline battery shown in FIG. 1 is covered with an external label 11. The cathode 4 is in the form of a hollow cylinder and is composed of a cathode mixture containing manganese dioxide, graphite, and an aqueous solution of potassium hydroxide. The anode 6 is composed of a gelled anode mixture containing granulated zinc, zinc oxide, an aqueous solution of potassium hydroxide, and a thickener. This anode mixture is disposed in the separator 5 being in the form of a cylinder having a bottom. The separator 5 is composed of, for example, a polyolefin nonwoven fabric and is in contact with the inner surface of the cylindrical cathode 4. The polyolefin nonwoven fabric is impregnated with a potassium hydroxide aqueous solution serving as an electrolytic solution. The sealing unit includes a sealing member 7, a reinforcing member 8, a current-collecting pin 9, and an anode 10.

The sealing member 7 has a through hole at the center thereof. The current-collecting pin 9 being in the form of a nail is injected into the sealing member 7 through the through hole and is in contact with the anode 6. The current-collecting pin 9 is composed of, for example, tin-plated brass.

Figure 2:
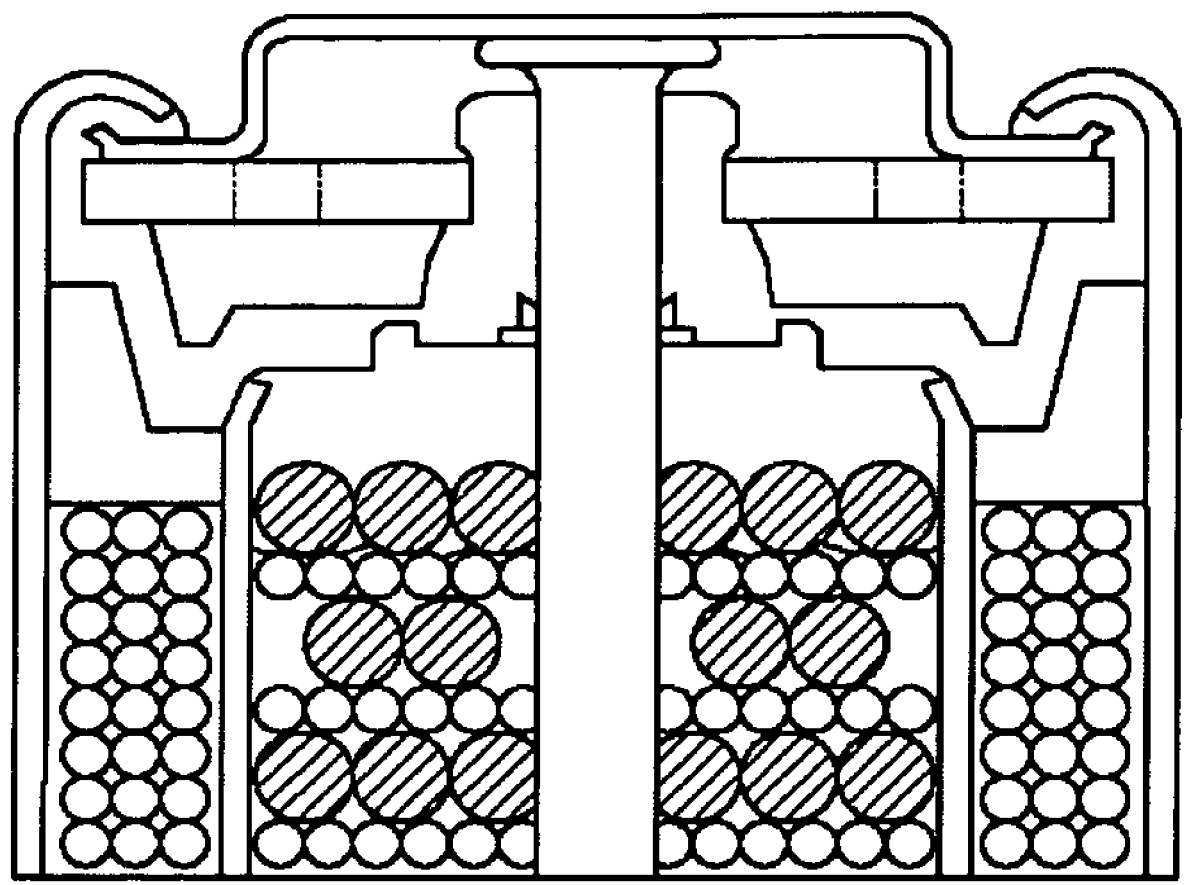
FIG. 2 shows an initial state of a size AA alkaline battery according to an embodiment of the present invention.
Figure 2:
Figure 2:
Figure 2:
Figure 2:

The reactions occurring at the cathode and the anode in the size AA alkaline battery, shown in FIG. 1, during charge will be described with reference to FIGS. 2 to 7. FIG. 2 shows a state in which the anode contains a predetermined amount of zinc oxide and a charging voltage is not applied. Here, there is no electron transfer. This state is referred to as an "initial state". In a graph shown in FIG. 7, the initial state corresponds to Point 2 where time is zero.

Figure 3:
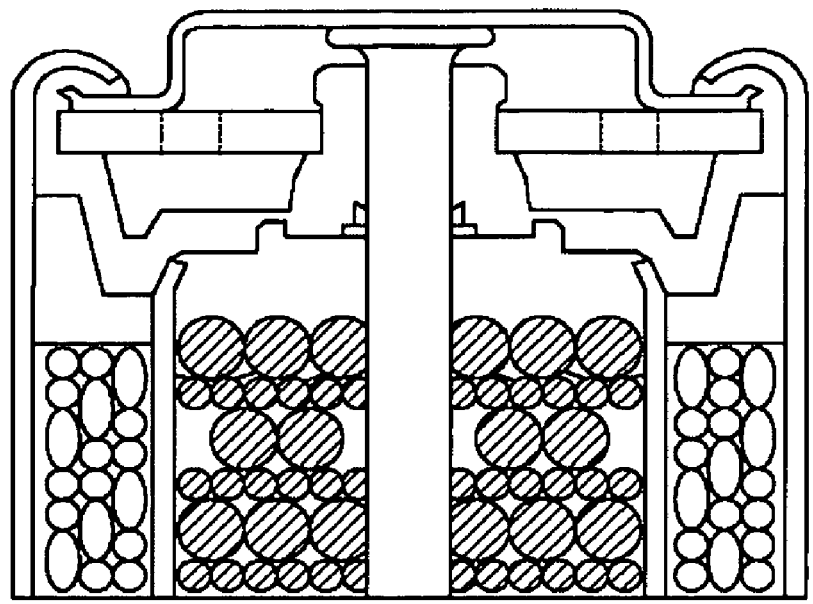
FIG. 3 shows a state of the size AA alkaline battery 30 minutes after the initiation of charge according to an embodiment of the present invention.

FIG. 3 shows a state about 30 minutes after the initiation of the charge. In this state, a reaction represented by reaction formula (1):

occurs. The reduction reaction of zinc oxide in the anode begins before a hydrogen-generating reaction shown in FIG. 4 starts. This reaction step corresponds to range 3 shown in FIG. 7.

Figure 4:
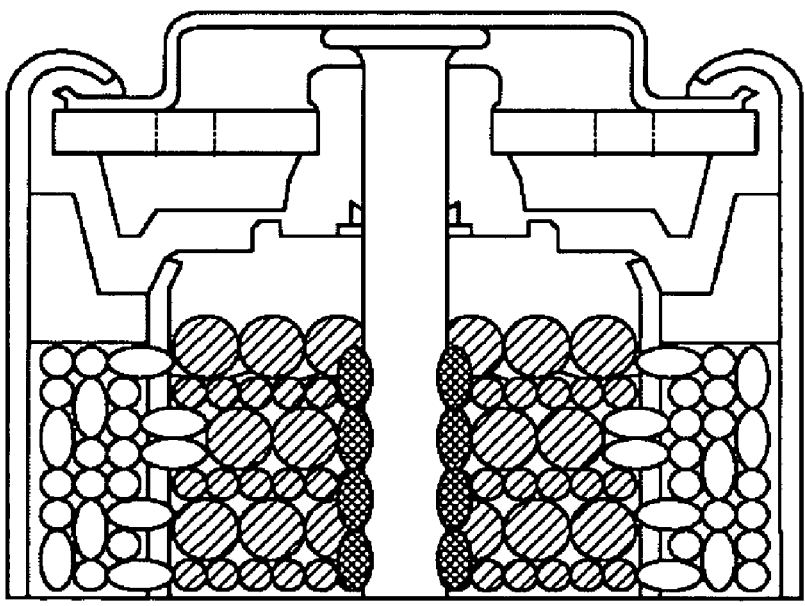
FIG. 4 shows a state of the size AA alkaline battery 30 to 80 minutes after the initiation of the charge according to an embodiment of the present invention.

FIG. 4 shows a state about 30 to 80 minutes after the initiation of the charge. In this state, a reaction represented by reaction formula (2):

occurs. The reduction reaction (1) of zinc oxide in the anode proceeds. Furthermore, an oxygen gas passes through the separator to reach the anode, thereby oxidizing zinc in the anode to form zinc oxide. This oxidation occurs before the hydrogen-generating reaction represented by reaction formula (2) starts. This reaction step corresponds to region 4 shown in FIG. 7.

Figure 5:
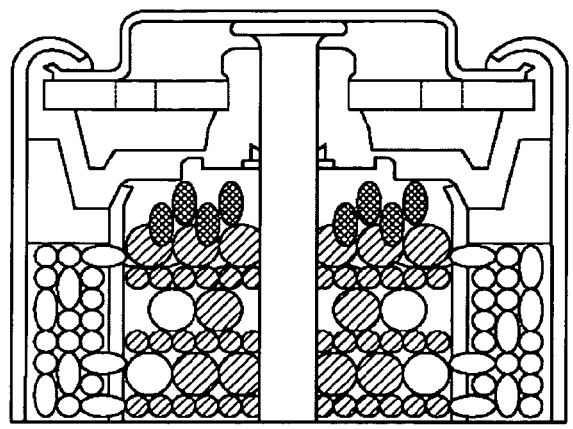
FIG. 5 shows a state of the size AA alkaline battery 80 to 130 minutes after the charge according to an embodiment of the present invention.
Figure 5:
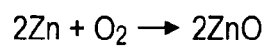

FIG. 5 shows a state about 80 to 130 minutes after the initiation of the charge. In this state, a reaction represented by reaction formula (3):

occurs. This is a reaction step in which zinc is oxidized by oxygen that has moved into the anode through the separator. The reaction step corresponds to region 5 shown in FIG. 7.

Figure 6:
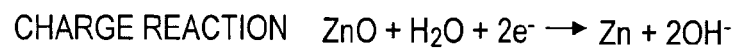
FIG. 6 shows a state of the size AA alkaline battery 130 minutes after the charge according to an embodiment of the present invention.
Figure 6:
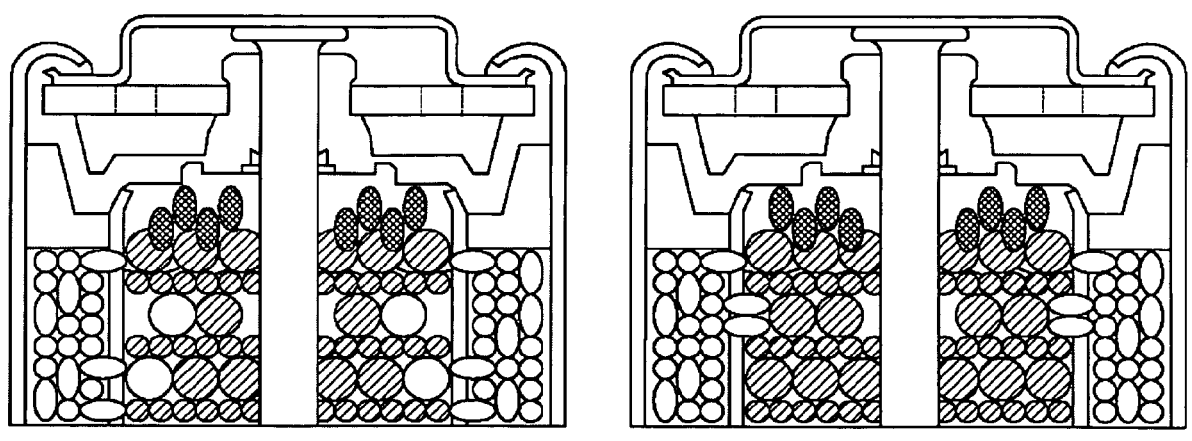
Figure 6:
Figure 7:
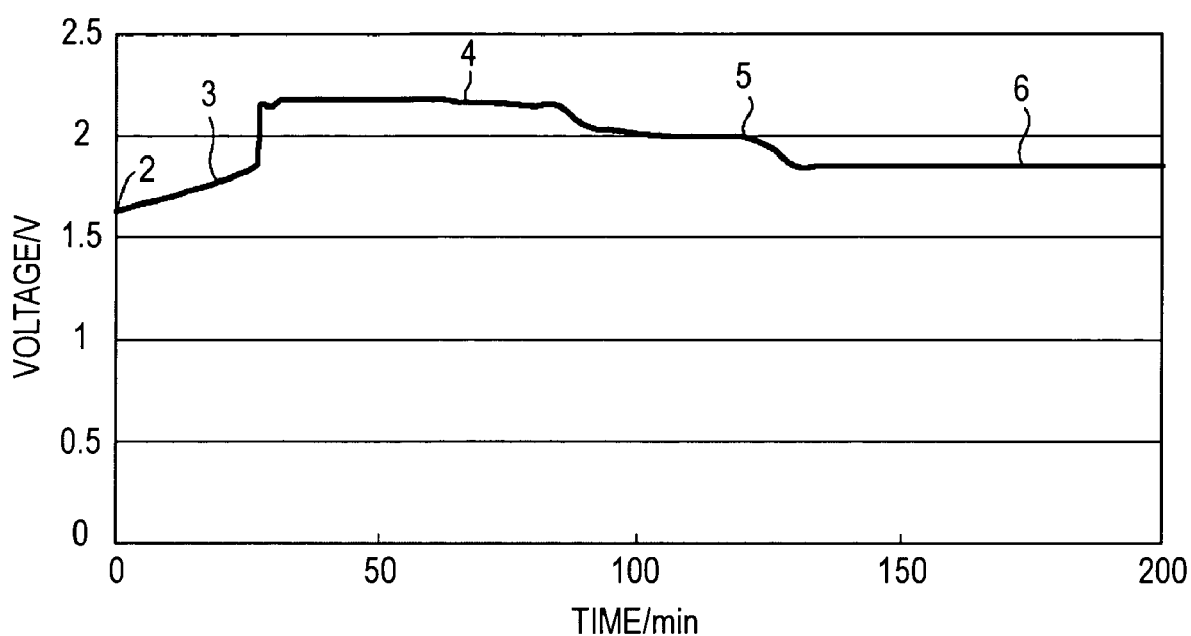
FIG. 7 is a graph showing the relationship between the voltage and the charging time of the size AA alkaline battery according to an embodiment of the present invention.

FIG. 6 shows a state at least 130 minutes after the initiation of the charge. A sufficient amount of oxygen moves from the cathode to the anode through the separator, thereby oxidizing zinc in the anode to form zinc oxide during the occurrence of the reactions shown in FIGS. 3 and 5. Therefore, even when zinc oxide that is contained from the start is consumed, the occurrence of a hydrogen gas is prevented. In this state, reactions represented by reaction formulae (4) and (5):

(charge reaction in anode)

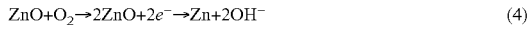

(chemical oxidation reaction)

occur. The reaction step corresponds to range 6 shown in FIG. 7.

In the cathode, a reaction represented by reaction formula (6):

(charge reaction in cathode)

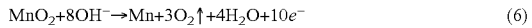

occurs from the initiation of the charge. Manganese dioxide is principally used as an active material in the cathode in this embodiment of the present invention. However, when nickel oxyhydroxide is used as a principal active material in the cathode, the same effect as above is achieved because the effect in the embodiment of the present invention is independent of the cathode.

In this embodiment, zinc oxide is contained in the anode of the battery. Alternatively, zinc oxide may be contained in the electrolyte with which the separator is impregnated. Furthermore, when zinc oxide is contained in the cathode, the same effect as above is achieved.

EXAMPLES

The present invention will be described in detail below based on EXAMPLES. However, the present invention is not limited to these EXAMPLES. In these EXAMPLES, size AA alkaline batteries each having a structure as shown in FIG. 1 were produced. To confirm the effect described above, discharge characteristics and the occurrence of leakage of the electrolyte when one battery among four batteries was installed in reverse polarity were evaluated.

Example 1-1

A cathode mixture was produced by uniformly mixing 85.5 percent by mass of manganese dioxide, 8 percent by mass of graphite, and 6.5 percent by mass of a 37% (mass concentration) aqueous solution of potassium hydroxide, and then 3.6 g of the cathode mixture was formed into a ring having an outer diameter of 13.2 mm, an inner diameter of 9.1 mm, and a height of 15 mm. The three resulting ring-shaped cathode mixtures were inserted into a cathode can. A nonwoven fabric having an air permeability of 130 ml/sec/cm² was wound into a three-layer cylinder, and the bottom of the cylinder was folded to produce a separator in the form of a cylinder having a bottom. The resulting separator had a total air-permeability of 43 ml/sec/cm². The separator was inserted into the hollow of the ring-shaped cathode. Into the separator, 1.12 g of a 37% (weight concentration) aqueous solution of potassium hydroxide was added dropwise. Next, 5.5 g of an anode mixture of 65 percent by mass of zinc, 1.5 percent by mass of zinc oxide, 0.5 percent by mass of a gelling agent, and 33 percent by mass of a 37% (weight concentration) aqueous solution of potassium hydroxide was inserted into the separator. Then, the opening of the cathode can was tightly sealed with a sealing unit including an anode terminal, a plastic seal, a reinforcing plate, and a nail-shaped current-collecting pin composed of tin-plated brass to produce a size AA alkaline battery. In this case, the amount of zinc oxide was 0.08 g in the battery.

Example 1-2

A size AA alkaline battery was produced as in EXAMPLE 1-1 except that a cylindrical separator having a bottom with a total air-permeability of 50 ml/sec/cm² was used, the separator being formed by winding a nonwoven fabric having an air permeability of 150 ml/sec/cm² into a three-layer cylinder and then folding the bottom of the resulting cylinder. The content of zinc oxide was 0.08 g in the battery.

Example 1-3

A size AA alkaline battery was produced as in EXAMPLE 1-1 except that a cylindrical separator having a bottom with a total air-permeability of 65 ml/sec/cm² was used, the separator being formed by winding a nonwoven fabric having an air permeability of 130 ml/sec/cm² into a two-layer cylinder and then folding the bottom of the resulting cylinder. The content of zinc oxide was 0.08 g in the battery.

Example 1-4

A size AA alkaline battery was produced as in EXAMPLE 1-1 except that a cylindrical separator having a bottom with a total air-permeability of 75 ml/sec/cm² was used, the separator being formed by winding a nonwoven fabric having an air permeability of 150 ml/sec/cm² into a two-layer cylinder and then folding the bottom of the resulting cylinder. The content of zinc oxide was 0.08 g in the battery.

Example 2-1

A size AA alkaline battery was produced as in EXAMPLE 1-1 except that the anode mixture was composed of 65 percent by mass of zinc, 1.8 percent by mass of zinc oxide, 0.5 percent by mass of the gelling agent, and 32.7 percent by mass of 37 percent (weight concentration) of the aqueous solution of potassium hydroxide. The content of zinc oxide was 0.1 g in the battery.

Example 2-2

A size AA alkaline battery was produced as in EXAMPLE 2-1 except that a cylindrical separator having a bottom with a total air-permeability of 50 ml/sec/cm² was used, the separator being formed by winding a nonwoven fabric having an air permeability of 150 ml/sec/cm² into a three-layer cylinder and then folding the bottom of the resulting cylinder. The content of zinc oxide was 0.1 g in the battery.

Example 2-3

A size AA alkaline battery was produced as in EXAMPLE 2-1 except that a cylindrical separator having a bottom with a total air-permeability of 65 ml/sec/cm² was used, the separator being formed by winding a nonwoven fabric having an air permeability of 130 ml/sec/cm² into a two-layer cylinder and then folding the bottom of the resulting cylinder. The content of zinc oxide was 0.1 g in the battery.

Example 2-4

A size AA alkaline battery was produced as in EXAMPLE 2-1 except that a cylindrical separator having a bottom with a total air-permeability of 75 ml/sec/cm² was used, the separator being formed by winding a nonwoven fabric having an air permeability of 150 ml/sec/cm² into a two-layer cylinder and then folding the bottom of the resulting cylinder. The content of zinc oxide was 0.1 g in the battery.

Comparative Example 1

A size AA alkaline battery was produced as in EXAMPLE 1-1 except that the anode mixture was composed of 65 percent by mass of zinc, 1.1 percent by mass of zinc oxide, 0.5 percent by mass of the gelling agent, and 33.4 percent by mass of 37 percent (weight concentration) of the aqueous solution of potassium hydroxide. The content of zinc oxide was 0.06 g in the battery.

Comparative Example 2

A size AA alkaline battery was produced as in EXAMPLE 1-1 except that the anode mixture was composed of 65 percent by mass of zinc, 2.2 percent by mass of zinc oxide, 0.5 percent by mass of the gelling agent, and 32.3 percent by mass of 37 percent (weight concentration) of the aqueous solution of potassium hydroxide. The content of zinc oxide was 0.12 g in the battery.

As described above, 60 batteries were produced for each of EXAMPLES 1-1 to 1-4, EXAMPLES 2-1 to 2-4, and COMPARATIVE EXAMPLES 1 and 2. To confirm the effect obtained in an embodiment of the present invention, when 10 batteries in each of EXAMPLES and COMPARATIVE EXAMPLES were each discharged at a constant current of 1,000 mA, the discharge time required for the voltage of each battery to reach 0.9 V was measured. When 10 batteries in each of EXAMPLES and COMPARATIVE EXAMPLES were each discharged at a constant current with a load of 40 Ω, the discharge time required for the voltage of each battery to reach 0.9 V was measured. Furthermore, 40 Ω-load reversal-installation tests were performed in five sets, each test determining whether the electrolyte leaked or not when one battery among four batteries connected in series was installed in reverse polarity with a load of 40 Ω. In addition, 30 Ω-load reversal-installation tests were performed in five sets, each test determining whether the electrolyte leaked or not when one battery among four batteries connected in series was installed in reverse polarity with a load of 30 Ω. Table 1 shows the results.

TABLE 1

| | Amount of zinc oxide added (g) | Total air permeability (ml/sec/cm$^2$) | Discharge test at 1,000 mA (mean, n = 10) | Discharge test with 40 Ω (mean, n = 10) | 30 Ω-load reversal-installation test (rate of occurrence of leakage) | 40 Ω-load reversal-installation test (rate of occurrence of leakage) |
|---|---|---|---|---|---|---|
| EXAMPLE 1-1 | 0.08 | 43 | 53 min | 85 h | 100% | 0% |
| EXAMPLE 1-2 | 0.08 | 50 | 53 min | 85 h | 0% | 0% |
| EXAMPLE 1-3 | 0.08 | 65 | 53 min | 85 h | 0% | 0% |
| EXAMPLE 1-4 | 0.08 | 75 | 53 min | 81 h | 0% | 0% |
| EXAMPLE 2-1 | 0.1 | 43 | 51 min | 85 h | 60% | 0% |
| EXAMPLE 2-2 | 0.1 | 50 | 51 min | 85 h | 0% | 0% |
| EXAMPLE 2-3 | 0.1 | 65 | 51 min | 85 h | 0% | 0% |
| EXAMPLE 2-4 | 0.1 | 75 | 51 min | 80 h | 0% | 0% |
| COMPARATIVE EXAMPLE 1 | 0.06 | 43 | 55 min | 85 h | 100% | 100% |
| COMPARATIVE EXAMPLE 2 | 0.12 | 43 | 46 min | 82 h | 40% | 0% |

As shown in Table 1, the batteries other than those in COMPARATIVE EXAMPLE 2 each have a discharge time of 50 minutes or more at a constant current of 1,000 mA. The batteries in COMPARATIVE EXAMPLE 2 excessively contained zinc oxide and thus each had an insufficient discharge capacity. In batteries in EXAMPLES 1-4 and 2-4, since the air permeability of each separator was excessively high, in each discharge test at a constant current with a load of 40 Ω, a reduction in capacity due to an internal short circuit was observed. In the 40 Ω-load reversal-installation tests, since batteries in all EXAMPLES and COMPARATIVE EXAMPLE 2 each have a large amount of zinc oxide, a large amount of electrical energy was used for converting zinc oxide into zinc, thereby preventing the generation of a hydrogen gas. Therefore, leakage of the electrolyte was difficult to occur.

In the 30 Ω-load reversal-installation tests, in which larger currents flow, since the batteries in EXAMPLES 1-2, 1-3, 1-4, 2-2, 2-3, and 2-4 each have the separator with high air permeability, oxygen generated in the cathode readily moves to the anode, thus chemically oxidizing zinc into zinc oxide. To convert the resulting zinc oxide into zinc, a large amount of electrical energy was used, thereby preventing the generation of a hydrogen gas. Therefore, leakage of the electrolyte can be suppressed.

It should be understood by those skilled in the art that various modifications, combinations, sub-combinations and alterations may occur depending on design requirements and other factors insofar as they are within the scope of the appended claims or the equivalents thereof.

What is claimed is:

1. A size AA alkaline battery comprising:
   an anode comprising zinc functioning as an active material said zinc being the largest component of said anode by amount;
   a cathode comprising manganese dioxide or nickel oxyhydroxide functioning as an active material said manganese dioxide or nickel oxyhydroxide being the largest component of said cathode by amount;
   a separator composed of a nonwoven fabric;
   an electrolyte composed of an aqueous solution of potassium hydroxide; and
   zinc oxide present in an amount of 0.08 to 0.1 g in any one of or any combination of said anode, and said cathode, wherein,
   the amount of zinc oxide is such that at an initial stage of the reaction in the battery when installed in reverse polarity, a reduction reaction of zinc oxide occurs before a hydrogen-generating reaction thereby suppressing the generation of hydrogen gas and an amount of oxygen such that the oxygen moves from the cathode to the anode through the separator thereby oxidizing zinc in the anode to form zinc oxide, and
   the total air-permeability of the separator composed of the nonwoven fabric is in the range of 50 to 65 ml/sec/cm$^2$.

2. The size AA alkaline battery according to claim 1, wherein the cathode includes a cathode mixture containing manganese dioxide; graphite; and an aqueous solution of potassium hydroxide.

3. The size AA alkaline battery according to claim 2, wherein the cathode is in the form of a hollow cylinder.

4. The size AA alkaline battery according to claim 1, wherein the anode includes a gelled anode mixture containing zinc; zinc oxide; an aqueous solution of potassium hydroxide; and a thickener.

5. The size AA alkaline battery according to claim 1, further comprising:
a hollow-cylindrical metal cathode can having an opening and a bottom, wherein the cathode can contains the cathode being in the form of a hollow cylinder, the separator being in contact with the inner surface of the cathode, the anode being disposed the inside the separator, and the electrolyte.

6. The size AA alkaline battery according to claim 5, wherein the metal cathode can includes a sealing unit for sealing the opening.

7. The size AA alkaline battery according to claim 6, wherein the sealing unit includes a sealing member; a reinforcing member; a current-collecting pin; and an anode terminal.

8. The size AA alkaline battery according to claim 1, wherein the separator composed of the nonwoven fabric is in the form of a cylinder having a bottom.

9. The size AA alkaline battery according to claim 1, wherein the separator is composed of a polyolefin nonwoven fabric.

* * * * *